United States Patent
Higuchi et al.

(10) Patent No.: US 9,413,499 B2
(45) Date of Patent: Aug. 9, 2016

(54) CODE MULTIPLEXING TRANSMISSION METHOD, TRANSMISSION APPARATUS AND RECEPTION APPARATUS

(75) Inventors: Kenichi Higuchi, Saitama (JP); Yoshihisa Kishiyama, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 1245 days.

(21) Appl. No.: 13/254,230

(22) PCT Filed: Mar. 1, 2010

(86) PCT No.: PCT/JP2010/053193
§ 371 (c)(1),
(2), (4) Date: Dec. 14, 2011

(87) PCT Pub. No.: WO2010/101097
PCT Pub. Date: Sep. 10, 2010

(65) Prior Publication Data
US 2012/0082023 A1 Apr. 5, 2012

(30) Foreign Application Priority Data
Mar. 3, 2009 (JP) ................................. 2009-049802

(51) Int. Cl.
*H04J 11/00* (2006.01)
*H04L 5/00* (2006.01)
(Continued)

(52) U.S. Cl.
CPC ............ *H04L 5/0021* (2013.01); *H04B 1/7103* (2013.01); *H04J 11/0026* (2013.01);
(Continued)

(58) Field of Classification Search
USPC ......................................................... 370/209
See application file for complete search history.

(56) References Cited

U.S. PATENT DOCUMENTS

2002/0075830 A1* 6/2002 Hartman, Jr. ................. 370/333
2004/0220983 A1* 11/2004 Kim ..................... H04L 27/2679
708/160

(Continued)

FOREIGN PATENT DOCUMENTS

JP 7-183829 A 7/1995
JP 10-190625 A 7/1998
(Continued)

OTHER PUBLICATIONS

Examination Report w/translation issued in Japan Patent Office Application No. 2009-049802, dated Dec. 4, 2012, (5 pages).
(Continued)

*Primary Examiner* — Gregory Sefcheck
*Assistant Examiner* — Majid Esmaeilian
(74) *Attorney, Agent, or Firm* — Osha Liang LLP

(57) ABSTRACT

To obtain a high frequency diversity effect while suppressing inter-code interference in code multiplexing transmission in an OFDM-based radio access scheme, a transmission apparatus is provided with an orthogonal spreading code generating section (10) that generates different spreading codes based on orthogonal code sequences, a phase rotation giving section (11) and spreading modulation section (12) which provide the information symbols or spreading codes with different phase rotation for each symbol sequence and then, spreads the information symbols with the spreading codes for each symbol sequence, and a multiplexing section (13) that multiplexes spread symbols of different symbol sequences, where the information symbols or the spreading codes are rotated by a phase rotation amount such that overlaps in a signal constellation in polar coordinates of spread symbols for transmitting different information symbols are controlled to within a required range.

11 Claims, 10 Drawing Sheets

(51) Int. Cl.
  *H04B 1/7103* (2011.01)
  *H04J 13/00* (2011.01)
  *H04L 27/26* (2006.01)

(52) U.S. Cl.
  CPC ......... *H04J13/0003* (2013.01); *H04J 13/0059* (2013.01); *H04L 27/2634* (2013.01); *H04L 27/2636* (2013.01); *H04J 13/0048* (2013.01)

(56) References Cited

U.S. PATENT DOCUMENTS

| | | | | |
|---|---|---|---|---|
| 2004/0260985 | A1* | 12/2004 | Krieger | H04J 3/0608 714/707 |
| 2007/0217485 | A1* | 9/2007 | Kawasaki | 375/146 |
| 2009/0005094 | A1* | 1/2009 | Lee | H04W 52/383 455/509 |
| 2009/0327835 | A1* | 12/2009 | Oteri et al. | 714/758 |
| 2011/0274219 | A1* | 11/2011 | Song | H04L 27/266 375/341 |
| 2013/0223576 | A1* | 8/2013 | Lee | H04L 27/2657 375/341 |

FOREIGN PATENT DOCUMENTS

| | | |
|---|---|---|
| JP | 2003-509967 A | 3/2003 |
| JP | 2005033310 A | 2/2005 |
| JP | 2007194727 A | 8/2007 |
| WO | 01/20866 A1 | 3/2001 |
| WO | 2007/034415 A2 | 3/2007 |
| WO | 2007/069172 A2 | 6/2007 |

OTHER PUBLICATIONS

Decision to Grant in corresponding Japanese Application No. JP2009-049802 mailed Nov. 5, 2013 (4 pages).

International Search Report w/translation from PCT/JP2010/053193 dated May 25, 2010 (7 pages).

3GPP TS 36.211 V8.8.0; "3rd Generation Partnership Project; Technical Specification Group Radio Access Network; Evolved Universal Terrestrial Radio Access (E-UTRA); Physical Channels and Modulation (Release 8)"; Sep. 2009 (83 pages).

Notification of Reasons for Rejection in corresponding Japanese application No. 2009-049802 dated May 7, 2013 (4 pages).

* cited by examiner

CODE MULTIPLEXING TRANSMISSION METHOD, TRANSMISSION APPARATUS AND RECEPTION APPARATUS

TECHNICAL FIELD

The present invention relates to a code multiplexing transmission method, transmission apparatus and reception apparatus in an OFDM (Orthogonal Frequency Division Multiplexing)-based radio access scheme.

BACKGROUND ART

The communication system that is a successor to the Wideband Code Division Multiple Access (WCDMA) system, High-Speed Downlink Packet Access (HSDPA) system, High-Speed Uplink Packet Access (HSUPA) system and the like i.e. Long Term Evolution (LTE) has been determined by 3GPP that is the standardization group of WCDMA. As a radio access scheme in LTE, an Orthogonal Frequency Division Multiplexing Access (OFDMA) system is defined in downlink, while a Single-Carrier Frequency Division Multiple Access (SC-FDMA)) system is defined in uplink.

The OFDMA system is a multicarrier system for dividing a frequency band into a plurality of narrow frequency bands (subcarriers), and assigning data onto each subcarrier to perform transmission. The subcarriers are orthogonal to one another and arranged densely on the frequency axis, high-speed transmission is thereby achieved, and it is expected enhancing spectral efficiency.

The SC-FDMA system is a single-carrier transmission system for dividing the frequency band for each terminal, and performing transmission using frequency bands different from one another among a plurality of terminals. It is possible to reduce interference between terminals with ease and effectively, it is further possible to reduce variations in transmission power, and therefore, this system is preferable from the viewpoints of low power consumption in the terminal, wide coverage, etc.

In addition, various code multiplexing transmission (or spreading transmission using spreading sequences) are applied to LTE (for example, see Non-patent Document 1). For example, on the PHICH (Physical Hybrid-ARQ Indicator Channel) in downlink, code multiplexing is performed using the Walsh code to transmit ACK/NACK of hybrid ARQ in response to the PUSCH (Physical Uplink Shared Channel). Further, on the PUCCH (Physical Uplink Control Channel) in uplink, spreading transmission is performed using CAZAC sequences.

CITATION LIST

Non-Patent Literature

Non-patent Document 1: 3GPP, TS36.211

SUMMARY OF INVENTION

Technical Problem

However, when a code multiplexing transmission method is applied in the OFDM-based radio access scheme, it is required further improving characteristics.

The invention was made in view of such a respect, and it is an object of the invention to provide a code multiplexing transmission method, transmission apparatus and reception apparatus with characteristics improved capable of obtaining a high frequency diversity effect.

Solution to Problem

A first aspect of the invention includes the steps of receiving information symbols of a plurality of sequences input in parallel, generating different spreading codes based on orthogonal code sequences, giving different phase rotation to the information symbols or the spreading codes for each symbol sequence and then, spreading the information symbols with the spreading codes for each symbol sequence, and multiplexing spread information symbols corresponding to different symbol sequences, where the information symbols or the spreading codes are rotated by a phase rotation amount for enabling overlaps in a signal constellation in polar coordinates of the spread information symbols for transmitting different information symbols to be controlled to within a required range.

According to the first aspect of the invention, since the information symbols or the spread signals are rotated by the phase rotation amount such that overlaps in a signal constellation of the spread information symbols are controlled to within a required range, it is possible to increase the distance between spread symbols as possible, and to obtain the sufficient frequency diversity gain and coding gain.

Further, a second aspect of the invention includes the steps of receiving a transmission signal including code-multiplexed symbols obtained by multiplexing spread symbols corresponding to different symbol sequences, acquiring information of phase rotation given to information symbols or spreading codes in code-multiplexing, in a transmitter, the code-multiplexed symbols included in a reception signal, and detecting the code-multiplexed symbols from the reception signal based on the information of phase rotation.

Technical Advantage of Invention

According to the invention, in code multiplexing transmission in the OFDM-based radio access scheme, it is possible to suppress inter-code interference, obtain a high frequency diversity effect, and improve characteristics.

DESCRIPTION OF EMBODIMENTS

Figure 1:
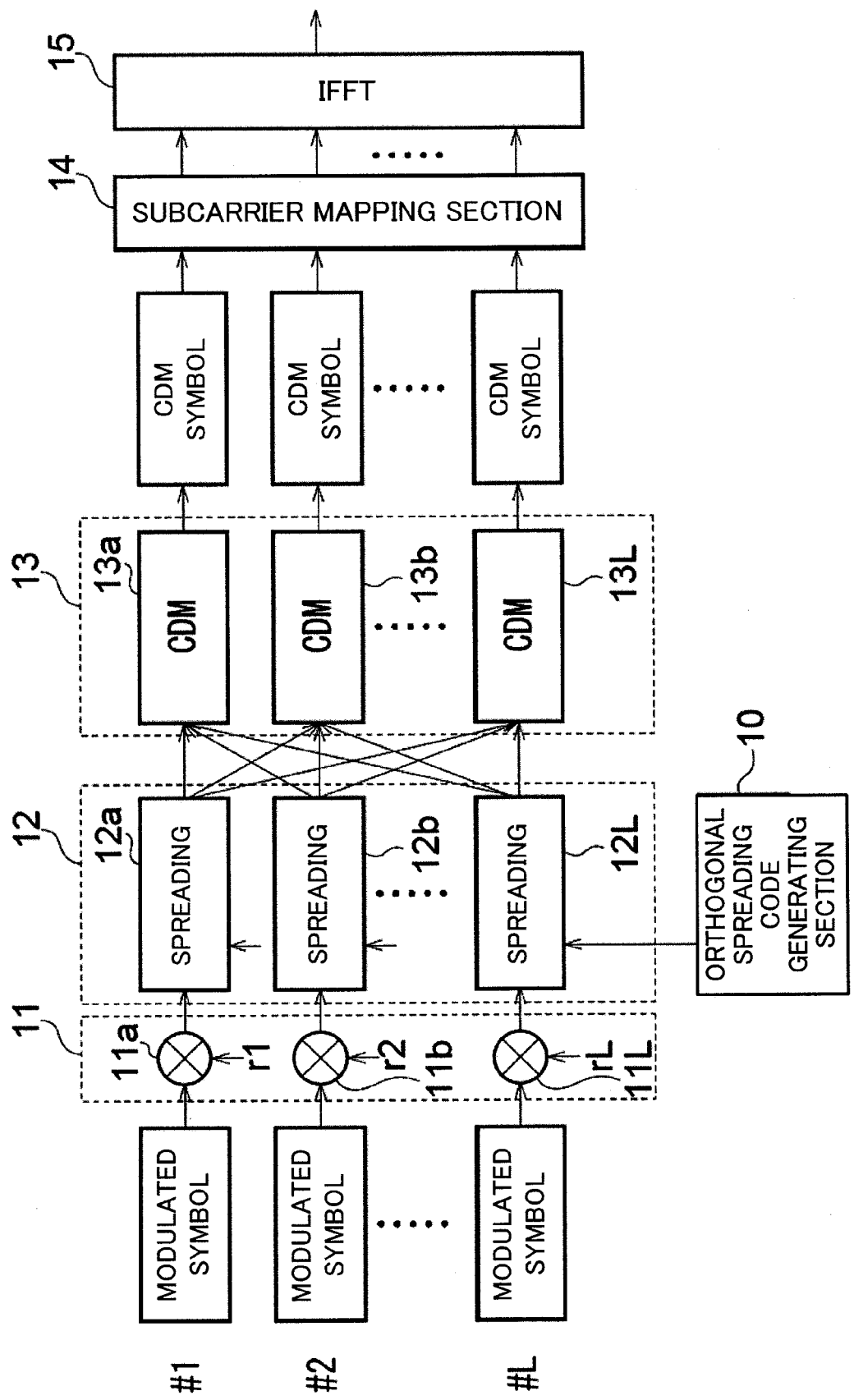
FIG. 1 is a diagram illustrating a configuration of principal part of a radio transmitter.

An Embodiment of the invention will specifically be described with reference to accompanying drawings.

Described first is a code multiplexing transmission method for providing known phase rotation for each symbol sequence.

In the code multiplexing transmission method, generally, data symbols of a plurality of sequences are multiplied by orthogonal spreading codes assigned for each symbol sequence for spreading modulation, spread symbols generated in spreading modulation are added to spread symbols of different symbol sequences for multiplexing, and the coded multiplexed symbols are placed on the frequency axis, subjected to Inverse Fast Fourier Transform (IFFT), and output as an OFDM signal.

It is possible to use orthogonal code sequences as spreading codes used in spreading data symbols. Among the orthogonal code sequences used as spreading codes in LTE are Walsh codes, CAZAC sequences, and phase rotation (DFT) sequences. Code multiplexing transmission using the Walsh code is adopted on the PHICH, and spreading transmission using the CAZAC sequence is adopted on the PUCCH. The PUSCH is regarded as code multiplexing transmission using the phase rotation (DFT) sequence. As the orthogonal code sequences, there are the Walsh code, CAZAC code, phase rotation (DFT) sequence, orthogonal M sequence, etc. and other orthogonal code sequences are also applicable.

Walsh code sequences with a length (spreading factor) $L=2^n$ are defined recursively by Equation (1).

[Formula 1]

$$W_1 = [1],$$
$$W_{2^n} = \begin{bmatrix} W_{2^{(n-1)}} & W_{2^{(n-1)}} \\ W_{2^{(n-1)}} & -W_{2^{(n-1)}} \end{bmatrix} \quad (1)$$

In the Walsh code sequences as shown in Eq. 1, a vector of each row is a spreading code to some symbol. Since the Walsh code sequences are orthogonal sequences, it is possible to achieve sufficient transmission characteristics in mapping spread symbols to subcarriers with high fading correlation so as to maintain orthogonality among code-multiplexed symbols, and in performing channel equalization to recover orthogonality of codes in a receiver.

In addition, in MC-CDMA, so as to obtain the highest frequency diversity effect and improve transmission characteristics of MC-CDMA, it is effective assigning spread symbols corresponding to the spreading factor to subcarriers undergoing mutually independent fading variations, and performing maximum likelihood detection on the receiver side. In this case, assuming that the fading variation of each subcarrier follows the independent Rayleigh distribution, the upper limit based on Chernoff bound of pairwise error rate Pe is expressed by Equation (2).

[Formula 2]

$$P_e \leq \prod_{i=1}^{L} \left( \frac{1}{1 + SNR d_i^2 / 8} \right) \quad (2)$$

$$\leq \frac{(SNR/8)^{-L}}{\prod_{i=1}^{L} d_i^2}$$

for large SNR if $d_i$ are not 0

Herein, SNR is a signal to noise power ratio, and di is the distance between spread symbols after performing ith code multiplexing with respect to combinations of information symbols corresponding to the number of multiplexes of two focused kinds of codes. In addition, QPSK modulation is assumed as data modulation.

In order to obtain sufficient frequency diversity gain and coding gain, it is desirable that the squared produce codeword distance between spread symbols is as large as possible without the distance di between spread symbols being all zero. However, in using spreading codes generated from the Walsh code sequences, when a combination of different information symbols is transmitted, the case of di=0 arises such that the same spread symbols are generated.

Figure 3:
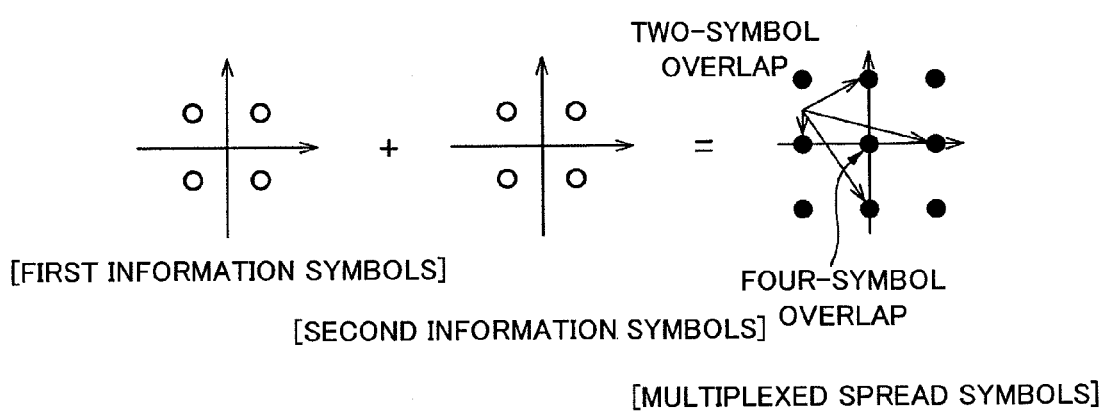
FIG. 3 is a diagram illustrating a constellation of spread symbols when the conventional Walsh code is used.

FIG. 3 is a diagram to explain the occurrence of inter-spread symbol distance di=0. Two information symbols subjected to QPSK modulation are respectively spread with the Walsh code with a length (spreading factor) L=2 and added. Seeing the signal constellation of multiplexed spread symbols of 16 spread symbols generated from two information symbols, maximum four spread symbols are placed in the same positions (di=0). Further, five positions exist where two spread symbols are placed in the same position (di=0).

To avoid the problem that the inter-symbol distance is zero in the Walsh code, the inventor of the invention conceived code sequences (hereinafter, referred to as a "rotational orthogonal code") for giving fixed (known) phase rotation for each spreading code. In the following description, the Walsh code sequence given phase rotation is called a "rotational Walsh code". The rotational Walsh code sequence $R_L$ with a length (spreading factor)=L is generated by Equation (3) based on the Walsh code sequence $W_L$.

[Formula 3]

$$R_L = W_L \text{diag}\{e^{j0\pi/4(L-1)}, \ldots, e^{j1\pi/4(L-1)}, \ldots, e^{j(L-1)\pi/4(L-1)}\} \quad (3)$$

diag{ . . . } is a diagonal matrix having elements inside the parentheses as diagonal components. Unique phase rotation spaced uniformly in the range of 0 to π/4 is given for each spreading code. By this means, it is possible to prevent signal points of spread symbols in the constellation from overlapping.

Different Phase rotation is given for each information symbol sequence, the Walsh code assigned to each sequence is then multiplied, and unique phase rotation is thereby given for each spreading code. By applying phase rotation to the spreading code (or information symbol) for each symbol sequence, it is possible to control the signal points of spread symbols on orthogonal coordinates not to overlap.

The fact that the signal points of spread symbols do not overlap is capable of including the case where a state in which part of spread symbols overlap exists, in addition to the state in which all the spread symbols do not overlap one another completely. It is important that it is possible to control the overlap state of the signal points of spread symbols to be desired state by giving fixed phase rotation for each information symbol sequence. This is not limited to the Walsh code, and corresponds to the case of performing spreading modulation using other orthogonal code sequences as spreading codes.

A radio transmitter to which is applied the code multiplexing transmission method for multiplexing codes using above-mentioned rotational orthogonal codes will specifically be described.

FIG. 1 is a diagram illustrating a configuration of principal part of the radio transmitter to which is applied the code multiplexing transmission method of the invention. The radio transmitter is provided with an orthogonal spreading code generating section 10, phase rotation giving section 11, spreading modulation section 12, code multiplexing section 13, subcarrier mapping section 14, and Inverse Fast Fourier Transform section 15.

The radio transmitter receives modulation symbols #1 to #L of a plurality of sequences that are obtained by modulating data symbols with a predetermined data modulation scheme. In the invention, the data content of the data symbol is not limited, and may be L sequences for performing serial-parallel transform on a single data symbol sequence on a predetermined symbol basis, or a data sequence of each user corresponding to the number (L) of users. FIG. 1 shows the existence of a plurality of symbol sequences targeted for code multiplexing. The data modulation scheme of data symbols may be QPSK, 16QAM and other modulation schemes, and herein, it is assumed that modulation symbols #1 to #L are obtained by performing data modulation using QPSK.

In the radio transmitter as shown in FIG. 1, the orthogonal spreading code generating section 10 generates different spreading codes for each symbol sequence corresponding to a plurality of symbol sequences. Herein, the section 10 generates Walsh codes such that spreading codes have the length (spreading factor)=L. Meanwhile, the phase rotation giving section 11 gives fixed (known) phase rotation to L symbol sequences for each symbol sequence. Phase weight multiplying sections 11-1 to 11-L constituting the phase rotation giving section 11 are rotated by a phase rotation amount calculated from $(\pi/4) \times (L-1)$ for L sequences in Eq. (3) as weights r1 to rL. More specifically, the weights r1 to rL for rotating the phase by $(\pi/4) \times (L-1)$ are beforehand calculated, and set on the phase weight multiplying sections 11-1 to 11-L. In other words, L symbol sequences are given phase rotation with different weighting (phase rotation amount) by the weights r1 to rL for each symbol sequence.

The spreading modulation section 12 is provided with spreading processing sections 12-1 to 12-L corresponding to the number of symbol sequences, and different spreading codes generated in the orthogonal spreading code generating section 10 are given to respective spreading processing sections 12-1 to 12-L. These spreading processing sections 12-1 to 12-L receive information symbols given different phase rotation for each sequence output from corresponding phase weight calculating sections 11-1 to 11-L of the phase rotation giving section 11. Each of the spreading processing sections 12-1 to 12-L multiplies a single information symbol given respective phase rotation by a respective spreading code to spread, and generates L spread symbols corresponding to the spreading factor for a single information symbol.

By thus performing phase rotation on the information symbol side targeted for spreading and then, multiplying by spreading codes, it is possible to obtain the effect equivalent to multiplying information symbols by rotational Walsh codes. In other words, there is the action of eliminating overlaps of signal points on the constellation among spread symbols of different symbol sequences.

FIG. 2(a) shows a signal constellation on orthogonal coordinates of spread symbols spread by rotational Walsh codes of L=2. As shown in the figure, 16 signal points of spread symbols are arranged without any overlap. Further, FIG. 2(b) shows a signal constellation on orthogonal coordinates of spread symbols spread by rotational Walsh codes of L=4. As shown in the figure, $2^4$ signal points of spread symbols are arranged without any overlap. In L=2, 4, QPSK is assumed as the modulation scheme of data symbols.

In the rotational Walsh code, by adding phase rotation equally spaced for each symbol sequence, it is understood that different spread symbols are certainly obtained in the case of transmitting a combination of different information symbols.

The code multiplexing section 13 is provided with spread symbol adding sections 13-1 to 13-L corresponding to the number associated with the spreading factor of the spreading modulation section 12. Each spread symbol adding section 13-1 receives spread symbols of different information symbols (#1 to #L) input from each of the spreading processing sections 12-1 to 12-L. Each of the spread symbol adding sections 13-1 to 13-L adds spread symbols of different symbol sequences (#1 to #L) output from the spreading modulation section 12 to generate a code multiplexed transmission symbol.

The code multiplexed transmission symbol output from each of the spread symbol adding sections 13-1 to 13-L of the code multiplexing section 13 is provided to the subcarrier mapping section 14. The subcarrier mapping section 14 divides the code multiplexed transmission symbol into a plurality of subcarriers to map onto the frequency axis, and performs subcarrier modulation corresponding to the code multiplexed transmission symbol. The multicarrier signal string is input to the Inverse Fast Fourier Transform section 15, subjected to Inverse Fast Fourier Transform, and thus transformed into a waveform on the time axis, and the resultant is output to a radio transmission section.

According to such a radio transmitter, spread symbols of each symbol sequence (#1 to #L) added in the spread symbol adding sections 13-1 to 13-L are spread symbols such that signal points on the constellation are absolutely different from one another. Accordingly, when each subcarrier undergoes independent Rayleigh fading in the propagation channel, it is possible to obtain the L-order diversity effect that is the highest when the receiver performs maximum likelihood detection.

In addition, since the rotational Walsh code sequences are of orthogonal codes, also in the case of performing signal detection such as MMSE (decorrelator) as a substitute for maximum likelihood detection, it is conceivable that good transmission characteristics are obtained.

Figure 2:
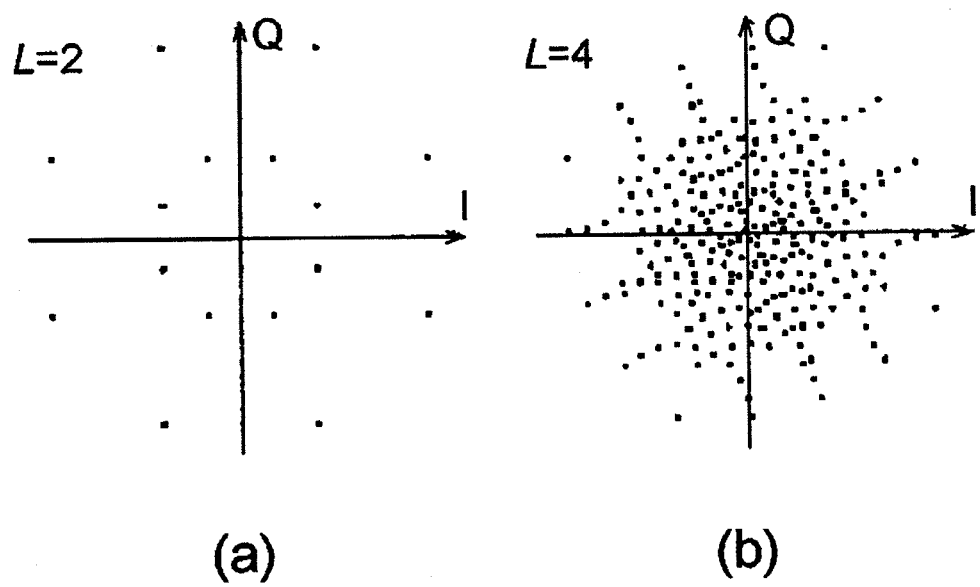
FIG. 2 contains diagrams illustrating a constellation of spread symbols when a rotational Walsh code is used.

In addition, as shown in FIG. 2, the signal point density of spread symbols is non-uniform in the rotational orthogonal codes including the above-mentioned rotational Walsh code sequences.

Therefore, proposed are spreading codes with a constellation of lattice-shaped arrangement of spread symbols subjected to code multiplexing so as to increase the inter-symbol distance di averagely. In right-angle phase amplitude modulation schemes (typified by QAM and 16QAM) of combination of amplitude modulation (AM) and phase modulation (PM), the signal constellation in which amplitude/phase assigned to the symbol is represented as a point in polar coordinates of two-dimensional plane is in the shape of an equally-spaced lattice. In the Description, the spreading code in which the signal constellation of code-multiplexed spread symbols is of lattice-shaped arrangement is called "QAM code".

In the case of length (spreading factor) L=2, assuming QPSK modulation, when two information symbols are respectively mapped to the first layer and the second layer of 16QAM alternately between two spread symbols, the spreading code is of Equation (4).

[Formula 4]

$$\begin{bmatrix} 1 & 1/2 \\ 1/2 & 1 \end{bmatrix} \quad (4)$$

In addition, to simplify the description, power is not normalized for representation.

Figure 6:
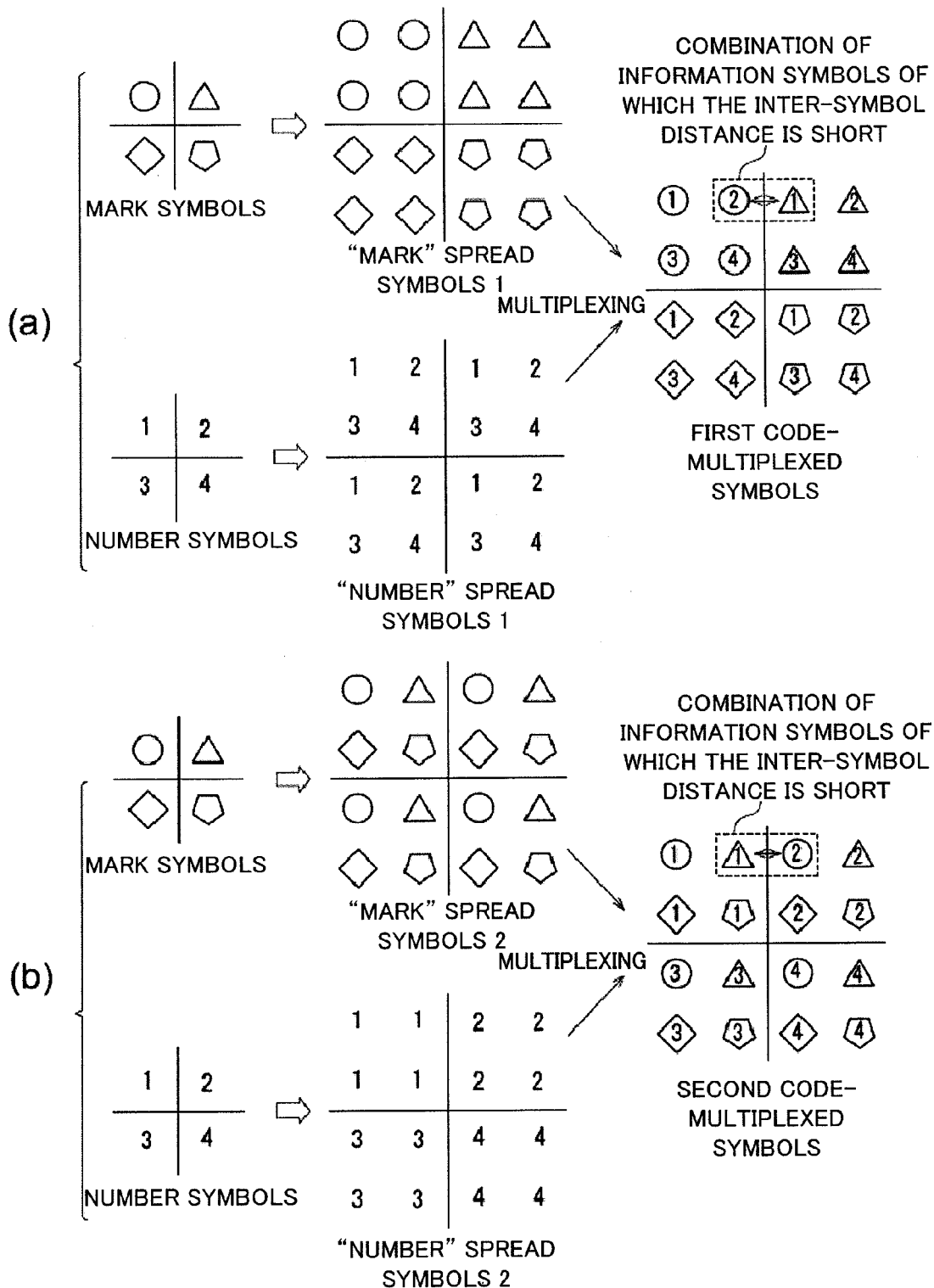
FIG. 6 contains conceptual diagrams of code multiplexing using the conventional QAM code.

However, as shown in FIGS. 6(a) and 6(b), the spreading code represented by Eq. 4 results in a combination of information symbols such that the inter-symbol distance is always short between two spread symbols. As information symbols of two sequences, FIG. 6 shows symbols of one symbol sequence represented by marks (circle, triangle, square, pentagon), and symbols of the other symbol sequence represented by numbers (1, 2, 3, 4). Assuming that information symbols prior to spreading are modulated with QPSK, the symbol represented by the mark is placed in a signal point of any of the circle, triangle, square and pentagon, and the symbol represented by the number is placed in a signal point of any of 1, 2, 3 and 4.

By spreading QPSK-modulated symbols represented by the "marks" with the spreading code of Eq. (4), "mark" spread symbols 1 shown in FIG. 6(a), and "mark" spread symbols 2 shown in FIG. 6(b) are generated. Further, by spreading QPSK-modulated symbols represented by the "numbers" with the spreading code of Eq. (4), "number" spread symbols 1 shown in FIG. 6(a), and "number" spread symbols 2 shown in FIG. 6(b) are generated. Then, the first code multiplexed symbols shown in FIG. 6(a) are generated by adding the "mark" spread symbols 1 and "number" spread symbols 1, and the second code multiplexed symbols shown in FIG. 6(b) are generated by adding the "mark" spread symbols 2 and "number" spread symbols 2.

By comparing the first code-multiplexed symbols and second code-multiplexed symbols 2, it is understood that the inter-symbol distances are always short between a spread symbol of combination of the information symbols "circle" and "2", and a spread symbol of combination of the information symbols "triangle" and "1".

Therefore, a spreading code represented by Equation (5) is generated so as to obtain a long inter-symbol distance averagely even in any combinations of information symbols.

[Formula 5]

$$P_2 = \begin{bmatrix} 1 & 1/2 \\ 1/2 & -1 \end{bmatrix} \quad (5)$$

FIGS. 5(a) and 5(b) show inter-symbol distances code-multiplexed symbols in the case of using the spreading code represented by Eq. (5). By comparing the first code-multiplexed symbols 1 shown in FIG. 5(a) and second code-multiplexed symbols 2 shown in FIG. 5(b), it is understood that the inter-symbol distance between a spread symbol of combination of the information symbols "circle" and "2", and a spread symbol of combination of the information symbols "triangle" and "1" is increased in the second code-multiplexed symbols.

It is possible to recursively define QAM code sequences such that long inter-symbol distances are averagely obtained in any combinations of information symbols using Equation (6).

[Formula 6]

$$P_1 = [1],$$
$$P_{2^n} = \begin{bmatrix} P_{2^{(n-1)}} & P_{2^{(n-1)}}/2^n \\ P_{2^{(n-1)}}/2^n & -P_{2^{(n-1)}} \end{bmatrix} \quad (6)$$

A radio transmitter to which is applied the code multiplexing transmission method using the QAM code as described above will specifically be described below.

Figure 4:
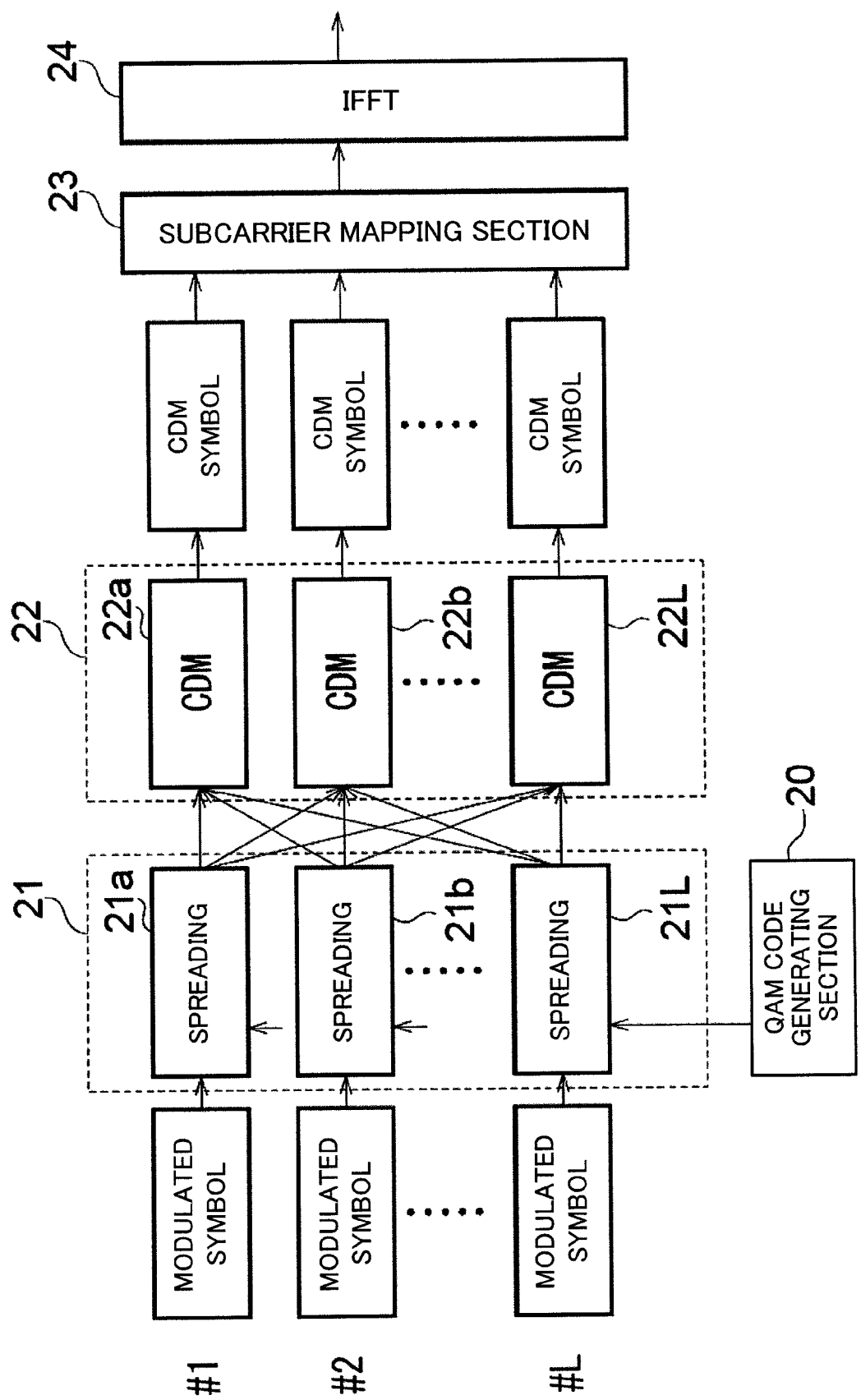
FIG. 4 is a diagram illustrating a configuration of a radio transmitter using a QAM code.

FIG. 4 is a diagram illustrating a configuration of principal part of the radio transmitter using the QAM code.

The radio transmitter is provided with an orthogonal spreading code generating section 20, spreading modulation section 21, code multiplexing section 22, subcarrier mapping section 23, and Inverse Fast Fourier Transform section 24. The code multiplexing section 22, subcarrier mapping section 23, and Inverse Fast Fourier Transform section 24 have the same functions as in the radio transmitter as shown in FIG. 1 described previously.

Figure 5:
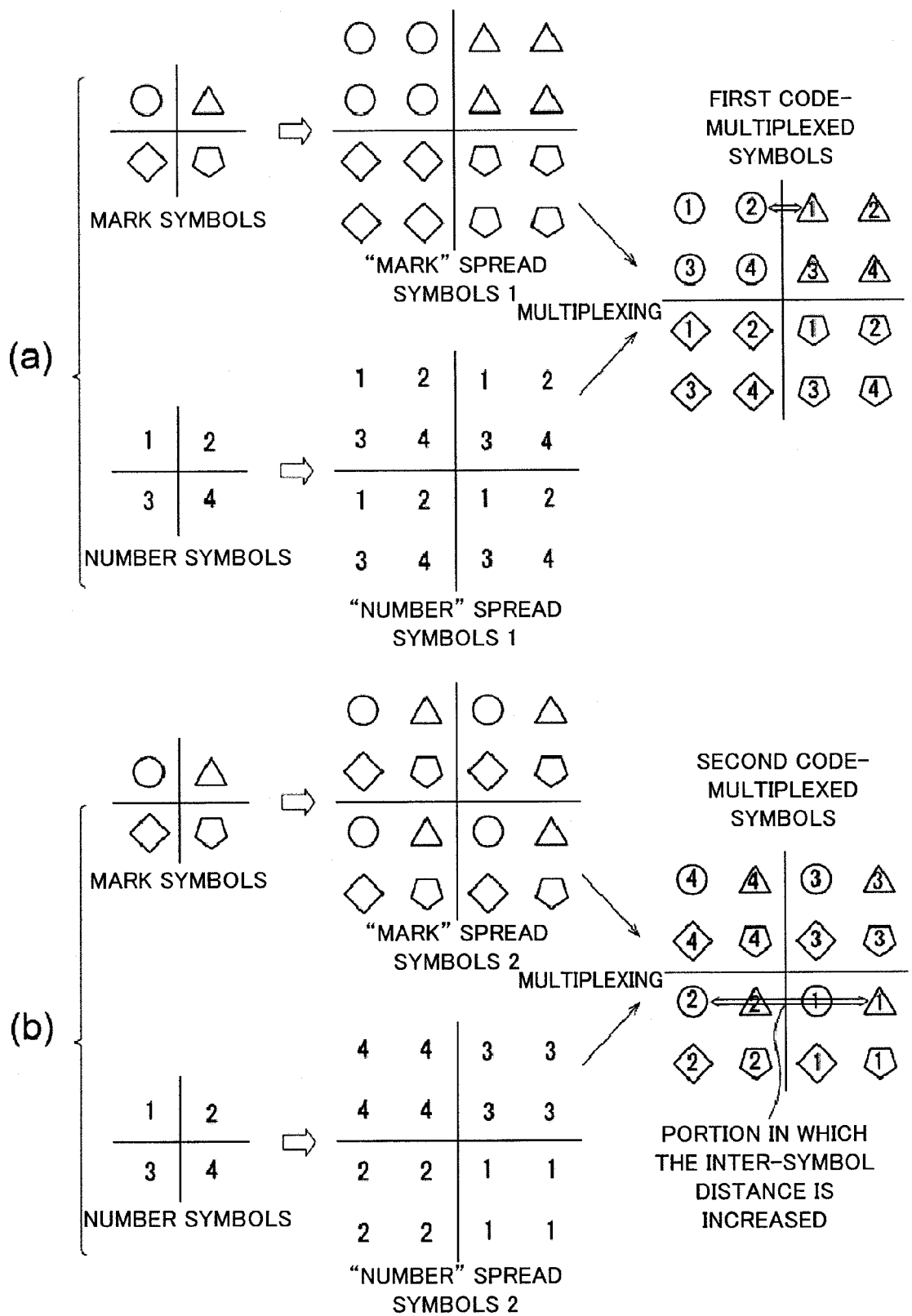
FIG. 5 contains conceptual diagrams of code multiplexing using an improved QAM code.

The orthogonal code generating section 20 generates QAM code sequences defined by Eq. (6), and gives a different QAM code (spreading code) to each of spreading code processing sections 21-1 to 21-L constituting the spreading modulation section 21. The QAM codes given to the spreading modulation section 21 are designed so that the signal constellation of code-multiplexed spread symbols is a lattice-shaped arrangement so as to averagely increase the inter-symbol distance di. Accordingly, as shown in FIGS. 5(a) and 5(b), when "mark" symbols and "number" symbols which are QPSK-modulated and arranged on the IQ plane undergo spreading modulation with the QAM codes, the symbols are transformed into "mark" spread symbols 1, 2 and "number" spread symbols 1, 2 with the signal constellation of the lattice-shaped arrangement. In the case of L=2 as shown in FIG. 5, the "mark" spread symbols 1 and "number" spread symbols 1 are input to one spreading adding section 22-1 of the code multiplexing section 22 and added, and the "mark" spread symbols 2 and "number" spread symbols 2 are input to the other spreading adding section 22-2 of the code multiplexing section 22 and added.

Since spreading is performed using the QAM code defined by Eq. (5) or Eq. (6), with respect to the inter-symbol distances in the first code-multiplexed symbols and second code-multiplexed symbols, long inter-symbol distances are averagely obtained in any combinations of information symbols.

An Embodiment will be described below in which the code multiplexing transmission method using the above-mentioned rotational orthogonal code sequences is applied to a physical channel in LTE or LTE-Advanced.

Figure 8:
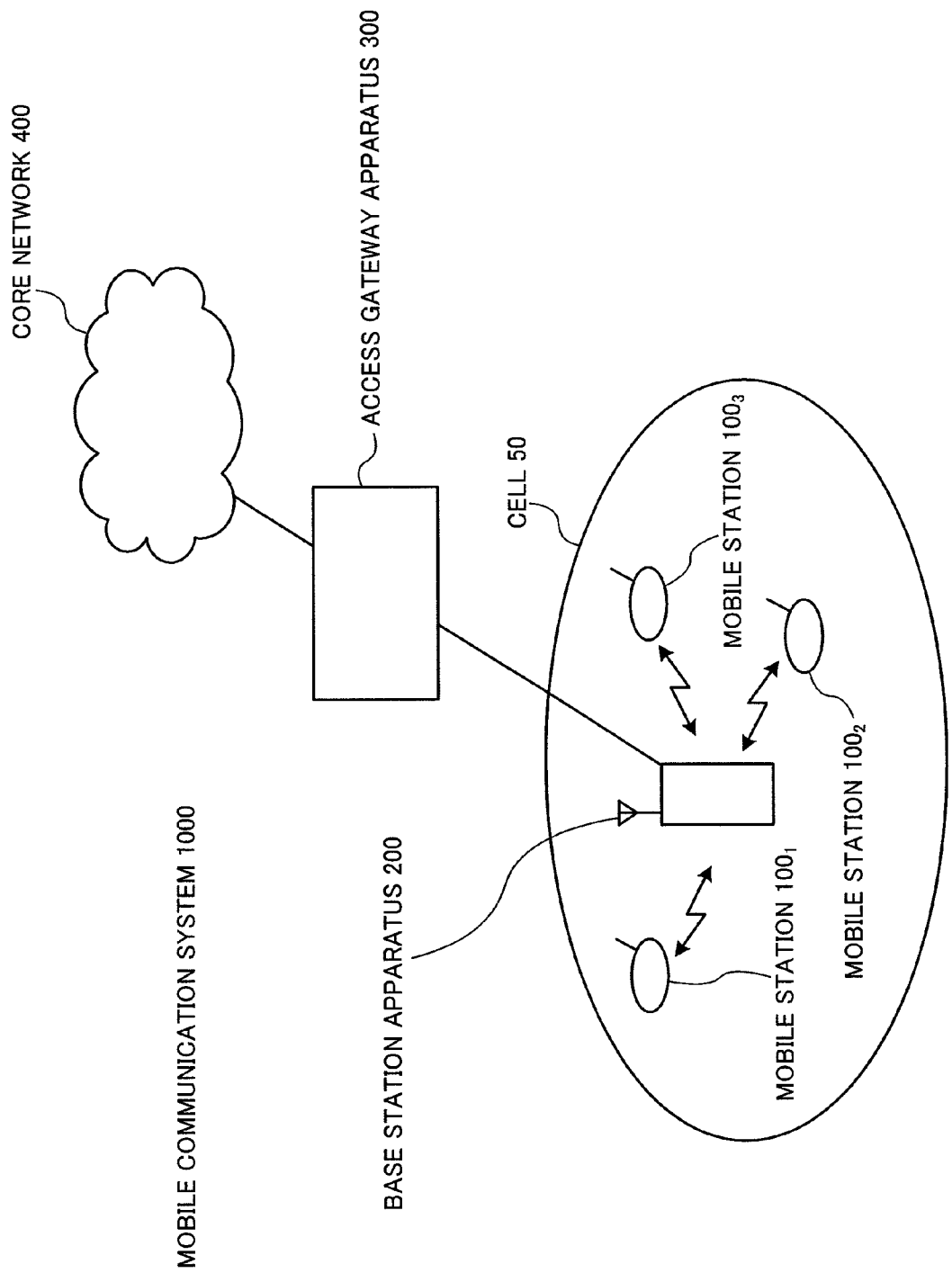
FIG. 8 is a schematic diagram of a mobile communication system having mobile stations and base station apparatus.

A mobile communication system having mobile stations and base station apparatus will be described with reference to FIG. 8.

A mobile communication system 1000 is based on the LTE system, where the code multiplexing transmission method using the above-mentioned rotational orthogonal code sequences is applied to the PHICH that is a physical channel for transmitting ACK/NACK in downlink, and the PUSCH in uplink. The mobile communication system 1000 is provided with a base station apparatus 200 and a plurality of mobile stations 100 ($100_1, 100_2, 100_3, \ldots, 100_n$, n is an integer where n>0) that communicates with the base station apparatus 200. The base station apparatus 200 is connected to an upper station, for example, access gateway apparatus 300, and the access gateway apparatus 300 is connected to a core network 400. Herein, the mobile station 100, communicates with the base station apparatus 200 in a cell 50 by LTE. In addition, the access gateway apparatus 300 may be also referred to as MME/SGW (Mobility Management Entity/Serving Gateway).

In the following description, each mobile station ($100_1, 100_2, 100_3, \ldots, 100_n$) has the same configuration, function and state, and is descried as the mobile station 100, below to give an explanation unless otherwise specified. For convenience in description, the mobile station performs radio communications with the radio base station, and more generally, may be user equipment (UE) including a mobile terminal and a fixed terminal.

In the mobile communication system 1000, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a multicarrier transmission system for dividing a frequency band into a plurality of narrow frequency bands (subcarriers), and mapping data onto each subcarrier to perform communications. SC-FDMA is a single-carrier transmission system for dividing the system band into bands comprised of one or more consecutive resource blocks for each terminal so that a plurality of terminals uses mutually different bands, and thereby reducing interference among the terminals.

Described herein are communication channels in the LTE system. In downlink, used are the Physical Downlink Shared Channel (PDSCH) shared among the mobile stations $100_n$, and the Physical Downlink Control Channel (Downlink L1/L2 control channel). On the Physical Downlink Shared Channel are transmitted signals of user data i.e. speech data and transmission data. Further, on the Physical Downlink Control Channel is notified scheduling information, spreading code information assigned to code multiplexing of transmission symbols on the PHICH and phase rotation information provided for each symbol sequence, spreading code information assigned to code multiplexing of transmission symbols on the PUSCH and phase rotation information provided for each symbol sequence, user IDs to perform communications using the Physical Downlink Shared Channel and information of the transport format of the user data i.e. Downlink Scheduling Information, user IDs to perform communications using the Physical Uplink Shared Channel and information of the transport format of the user data i.e. Uplink Scheduling Grant, etc. In addition, instead of signaling, the control information (spreading code information and phase rotation information) concerning code multiplexing of transmission symbols on the PHICH and PUSCH may be beforehand defined known information in the mobile station 100 to enable the mobile station 100 to code-multiplex transmission symbols without receiving signaling from the base station apparatus 200.

Further, in downlink, broadcast channels are transmitted such as the Physical-Broadcast Channel (P-BCH) and Dynamic Broadcast Channel (D-BCH). The information transmitted on the P-BCH is Master Information Block (MIB), and the information transmitted on the D-BCH is System Information Block (SIB). The D-BCH is mapped to the PDSCH, and is transmitted to the mobile station $100n$ from the base station apparatus 200.

In uplink, used are the Physical Uplink Shared Channel (PUSCH) shared among the mobile stations 100, and the Physical Uplink Control Channel (PUCCH) that is a control channel in uplink. Symbol sequences of the user data i.e. speech data and transmission data transmitted on the Physical Uplink Shared Channel are code-multiplexed by the rotational orthogonal code and transmitted. Further, on the Physical Uplink Control Channel is transmitted precoding information for downlink MIMO transmission, acknowledgement information in response to the shared channel in downlink, radio quality information (CQI: Channel Quality Indicator) of downlink, etc.

In addition, in uplink, the Physical Random Access Channel (PRACH) for initial connection, etc. is defined. The mobile station 100 transmits a random access preamble on the PRACH.

Figure 9:
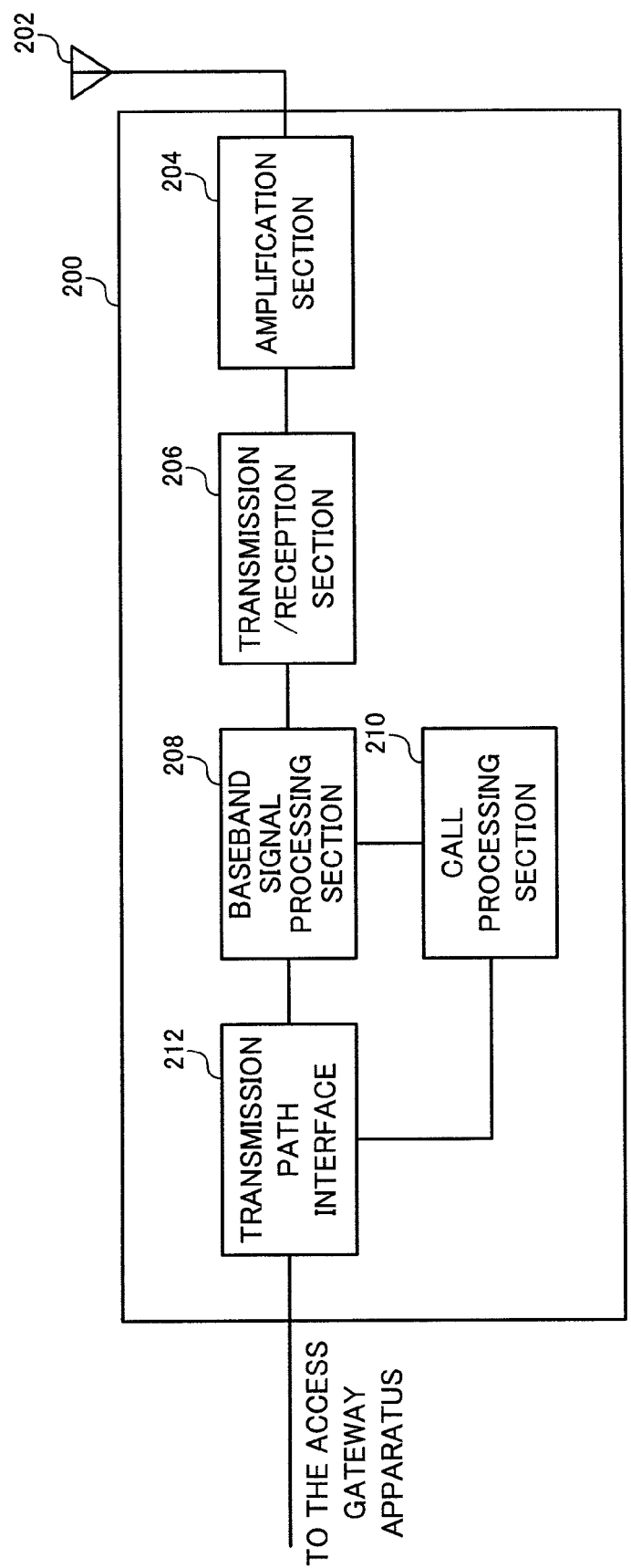
FIG. 9 is a schematic configuration diagram of the base station apparatus as shown in FIG. 8.

The base station apparatus 200 according to the Embodiment of the invention will be described with reference to FIG. 9. The base station apparatus 200 according to this Embodiment is provided with a transmission/reception antenna 202, amplifying section 204, transmission/reception section 206, baseband signal processing section 208, call processing section 210 and transmission path interface 212. The invention is applicable to MIMO transmission, but components concerning MIMO transmission are omitted in the Embodiment.

The user data (speech data for speech communications or transmission data for data communications) transmitted from the base station apparatus 200 to the mobile station 100 in downlink is input to the baseband signal processing section 208 via the transmission path interface 212 from an upper station positioned higher than the base station apparatus 200, for example, access gateway apparatus 300.

The baseband signal processing section 208 performs PDCP layer processing, segmentation and concatenation of user data, RLC (Radio Link Control) layer transmission processing such as transmission processing of RLC retransmission control, MAC (Medium Access Control) retransmission control e.g. transmission processing of HARQ (Hybrid Automatic Repeat request), scheduling, transmission format selection, channel coding, and Inverse Fast Fourier Transform (IFFT) processing on the data to transfer to the transmission/reception section 206. Further, signals (downlink control information) of the Physical Downlink Control Channel also undergo the transmission processing such as channel coding and Inverse Fast Fourier Transform, and are transferred to the transmission/reception section 206.

Further, the baseband signal processing section 208 notifies the mobile station 100 of control information for communications in the cell on the above-mentioned broadcast channel. The control information for communications in the cell is capable of including the system bandwidth in uplink or downlink, allocation information of radio resources allocated to the mobile station 100, identification information (Root Sequence Index) for a route sequence to generate a signal of random access preamble on the PRACH, etc.

Furthermore, the baseband signal processing section 208 notifies the mobile station 100 of the rotational Walsh code assigned to the mobile station 100 for code multiplexing of PHICH and phase rotation information on the downlink control channel. In addition, the invention is not limited thereto when the mobile station 100 beforehand stores the rotational Walsh code and phase rotation information as code multiplexing parameters of the PHICH as known information.

The transmission/reception section 206 performs frequency conversion processing for converting the baseband signal output from the baseband signal processing section 208 into a signal of a radio frequency band, and then, the signal is amplified in the amplifying section 204, and is transmitted from the transmission/reception antenna 202.

Meanwhile, with respect to the data transmitted from the mobile station 100 to the base station apparatus 200 in uplink, a radio frequency signal received in the transmission/reception antenna 202 is amplified in the amplifying section 204, undergoes frequency conversion in the transmission/reception section 206, is thereby converted into a baseband signal, and is input to the baseband signal processing section 208.

The baseband signal processing section 208 performs FFT processing, MLD processing, IDFT processing, error correcting decoding, reception processing of MAC retransmission processing, and reception processing of RLC layer and PDCP layer on the user data included in the input baseband signal, and the data is transferred to the access gateway apparatus 300 via the transmission path interface 212. In the MLD processing, the section 208 decodes the PUSCH subjected to code multiplexing using the phase rotational (DFT) sequences based on the phase rotation amount information, and performs maximum likelihood detection. The phase rotation amount information of the PUSCH may be of a scheme of signaling from the mobile station 100, or a scheme of signaling from the base station 200 to the mobile station 100. Alternately, instead of the signaling scheme, the phase rotation amount information of the PUSCH may be of a scheme of beforehand storing as code multiplexing parameters of the PUSCH of the base station 200 and mobile station 100.

The call processing section 210 performs call processing such as setting and release of the communication channel, status management of the radio base station 200, and management of radio resources.

Figure 7:
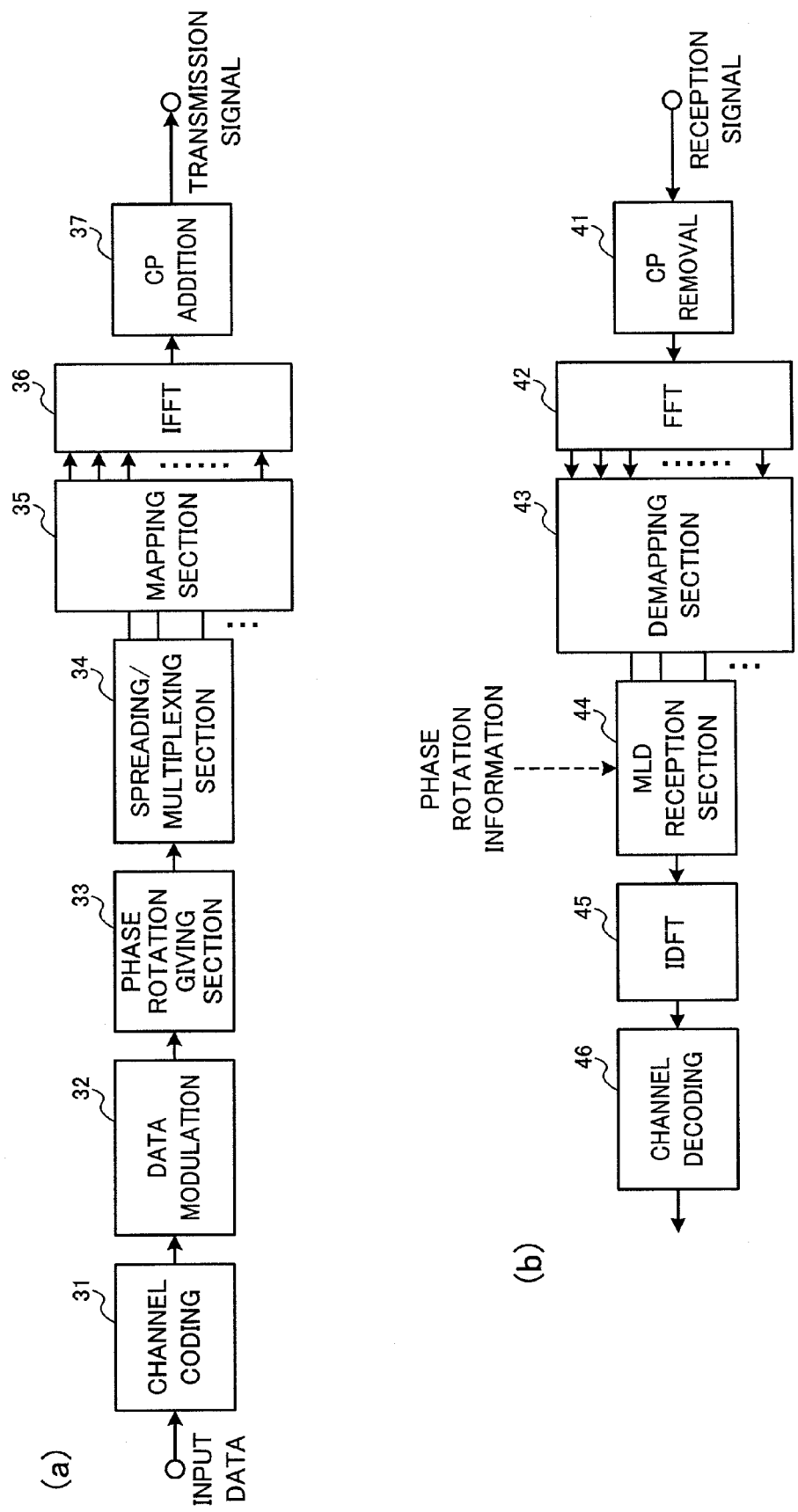
FIG. 7($a$) is a functional block diagram of a transmission series in a baseband processing section in a base station apparatus, and FIG. 7($b$) is a functional block diagram of a reception series in the baseband processing section in the base station apparatus.

FIG. 7 contains configuration diagrams of the baseband signal processing section 208 of the radio base station 200, where FIG. 7(a) shows functional blocks of a transmission processing series, and FIG. 7(b) shows functional blocks of a reception processing series.

The transmission processing series is provided with a channel coding section 31 that applies error correction and interleaving to downlink transmission data, a data modulation section 32 that performs data modulation on coded data with a predetermined modulation scheme (for example, QPSK), a phase rotation giving section 33 that gives different phase rotation for each symbol sequence, a spreading/multiplexing section 34 that spreads information symbols using the rotational Walsh code and that multiplexes spread symbols, a mapping section 35 that maps code-multiplexed symbols onto the frequency domain, an Inverse Fast Fourier Transform section 36 that performs Inverse Fast Fourier Transform on coded multiplexed symbols, and a CP adding section 37 that adds a cyclic prefix. The configuration of the transmitter as shown in FIG. 1 corresponds to the phase rotation giving section 33, spreading/multiplexing section 34, mapping section 35 and Inverse Fast Fourier Transform section 36 in the transmission processing series. In this Embodiment, the input data of the channel coding section 31 is transmission data transmitted on the PHICH, and the spreading/multiplexing section 34 gives phase rotation to information symbols using the rotational Walsh code recursively defined by Eq. (3) to spread. The mapping section 35 assigns multiplexed spread symbols to subcarriers respectively undergoing independent fading variations.

The reception processing series is provided with a CP removing section 41 that removes a cyclic prefix from a reception signal, a Fast Fourier Transform section 42 that performs Fast Fourier Transform on the reception signal, a demapping section 43 that demaps the signal in the frequency domain transformed by Fourier Transform, an MLD reception section 44 that performs signal detection on a demapped reception symbol according to maximum likelihood detection, an IDFT section 45 that despreads (IDFT) the reception symbol detected in the MLD reception section 44, and a channel decoding section 46 that deinterleaves a despread reception symbol sequence to perform channel decoding. In this Embodiment, the reception signal is reception data transmitted on the PUSCH, and the mobile station 100 provides transmission symbols with phase rotation, and performs code-multiplexing using the phase rotational (DFT) code. The MLD reception section 44 considers phase rotation provided on the transmission side (mobile station) to specify signal points according to the phase rotation information provided on the transmission side, and estimates reception symbols. The reception signal detected in the MLD reception section 44 is despread in the IDFT section 45, and output to the channel decoding section 46.

As described above, the radio base station 200 provides the transmission data transmitted on the PHICH with phase rotation for each symbol sequence, spreads the resultant using the Walsh code in the spreading/multiplexing section 34, and performs code-multiplexing to transmit in downlink, and it is thereby possible to obtain the maximum frequency diversity effect and improve transmission characteristics.

Figure 10:
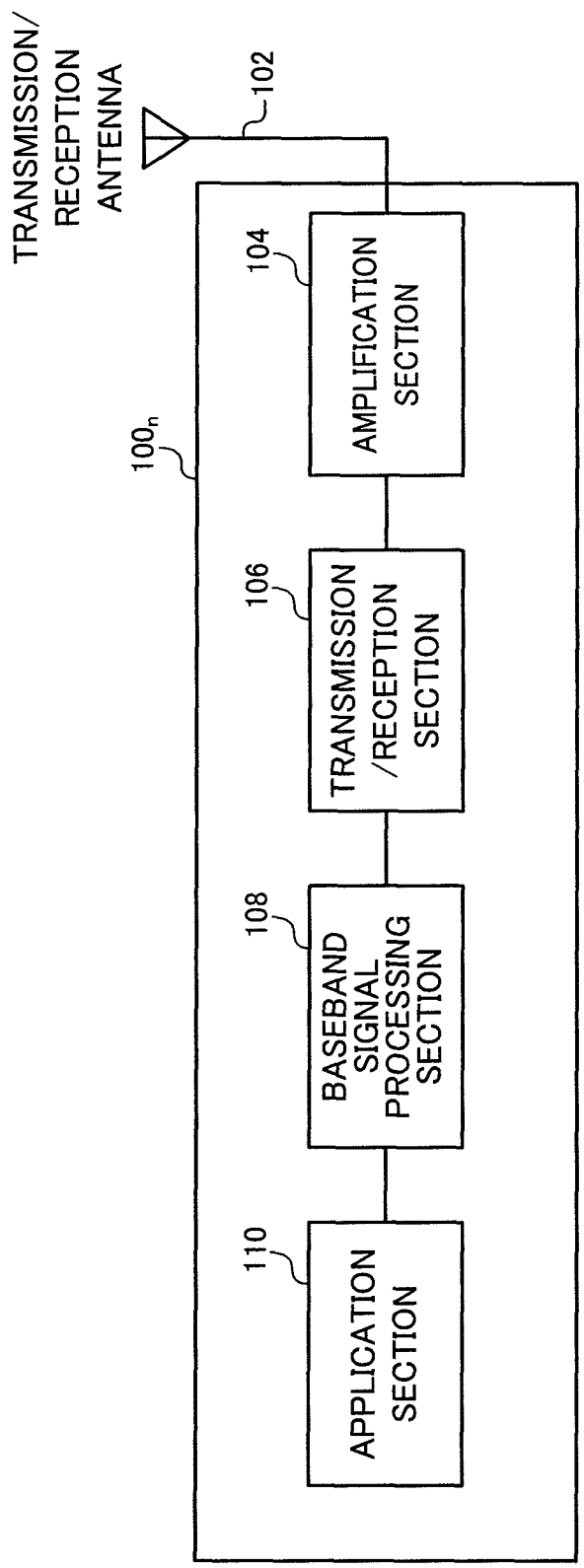
FIG. 10 is a schematic configuration diagram of the mobile station as shown in FIG. 8.

The mobile station 100 according to the Embodiment of the invention will be described with reference to FIG. 10. In FIG. 10, the mobile station 100 is provided with a transmission/reception antenna 102, amplifying section 104, transmission/reception section 106, baseband signal processing section 108, and application section 110.

With respect to data in downlink, a radio frequency signal received in the transmission/reception antenna 102 is amplified in the amplifying section 104, subjected to frequency conversion in the transmission/reception section 106, and converted into a baseband signal. The baseband signal processing section 108 performs FFT processing, MLD processing, error correcting decoding, reception processing of retransmission control and the like on the baseband signal. In the data in downlink, the user data (speech data, transmission data) in downlink is transferred to the application section 110. The application section 110 performs processing concerning layers higher than the physical layer and MAC layer. Further, in the data in downlink, the broadcast information is also transferred to the application section 110.

Meanwhile, the user data in uplink is input to the baseband signal processing section 108 from the application section 110. The baseband signal processing section 108 performs transmission processing of retransmission control (H-ARQ (Hybrid ARQ)), channel coding, DFT processing, IFFT processing and the like on the data to transfer to the transmission/reception section 106. The transmission/reception section 106 performs frequency conversion processing for converting the baseband signal output from the baseband signal processing section 108 into a signal with a radio frequency band, and then, the signal is amplified in the amplifying section 104, and is transmitted from the transmission/reception antenna 102.

Figure 11:
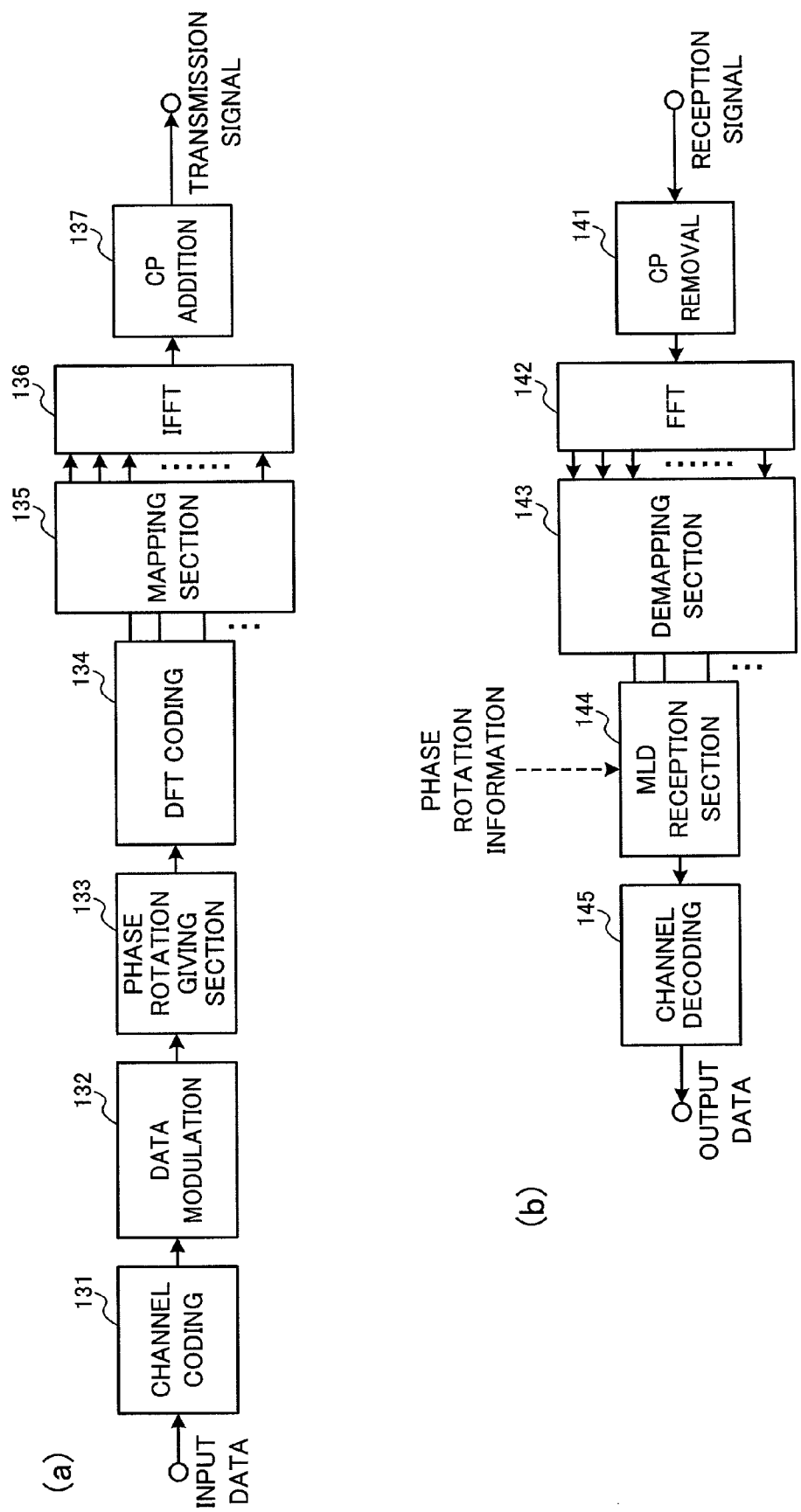
FIG. 11(*a*) is a functional block diagram of a transmission series in a baseband processing section in the mobile station, and FIG. 11(*b*) is a functional block diagram of a reception series in the baseband processing section in the mobile station.

FIG. 11 contains configuration diagrams of the baseband signal processing section 108 of the mobile station 100, where FIG. 11(a) shows functional blocks of a transmission processing series, and FIG. 11(b) shows functional blocks of a reception processing series.

The transmission processing series is provided with a channel coding section 131 that applies error correction and interleaving to uplink transmission data, a data modulation section 132 that performs data modulation on coded data with a predetermined modulation scheme (for example, QPSK), a phase rotation giving section 133 that gives different phase rotation for each symbol sequence, a DFT coding section 134 that spreads information symbols using the rotational phase (DFT) code and that multiplexes spread symbols, a mapping section 135 that maps code-multiplexed symbols onto the frequency domain, an Inverse Fast Fourier Transform section 136 that performs Inverse Fast Fourier Transform on coded multiplexed symbols, and a CP adding section 137 that adds a cyclic prefix. The configuration of the transmitter as shown in FIG. 1 corresponds to the phase rotation giving section 133, DFT coding section 134, mapping section 135 and Inverse Fast Fourier Transform section 136 in the transmission processing series. In this Embodiment, the input data of the channel coding section 131 is transmission data transmitted on the PUSCH, and the DFT coding section 134 spreads the resultant with DFT that is the phase rotational (DFT) code. The mapping section 135 maps the multiplexed spread symbol to a single carrier comprised of consecutive subcarriers.

In the reception processing series, a reception signal output from the transmission/reception section 106 is input to a CP removing section 141 and the cyclic prefix is removed. A Fast Fourier Transform section 142 performs Fast Fourier Transform on the CP-removed reception signal, and converts time-series signal components into a string of frequency components. A subcarrier demapping section 143 performs subcarrier demapping to divide into a reference signal transmitting a RS sequence signal, control channel (for example, PHICH, PDCCH) for transmitting the downlink control information, and shared channel (for example, PDSCH) for transmitting the user data.

The reception symbol of the PHICH is input to an MLD reception section 144. The MLD reception section 144 performs signal detection on the demapped reception symbol according to the maximum likelihood detection method. A channel decoding section 145 deinterleaves the reception symbol sequence detected in the MLD reception section 144 to perform channel decoding.

As described above, the mobile station 100 provides the transmission data transmitted on the PUSCH with phase rotation for each symbol sequence, then spreads (DFT) the resultant using the phase rotational (DFT) code, and performs code-multiplexing to transmit in uplink, and it is thereby possible to obtain the maximum frequency diversity effect and improve transmission characteristics.

As described above, it is possible to apply the code multiplexing transmission method using rotational orthogonal codes to the coexisting physical channels (PHICH, PUSCH) on which code multiplexing transmission is performed and the coexisting physical channel (PUCCH) on which spreading transmission is performed in the LTE system. Further, as a substitute for the rotational orthogonal code, it is possible to apply the code multiplexing transmission method using QAM codes.

Further, it is possible to apply the code multiplexing transmission method using rotational orthogonal codes or QAM codes of the invention to coexisting physical channels on which code multiplexing is not defined in LTE. For example, in LTE, spreading transmission using CAZAC sequences is defined on the physical channel (PUCCH) for transmitting CQI, and ACK/NACK in uplink (no code multiplexing in a single user), and it is possible to apply the code multiplexing transmission method using a plurality of cyclic shifts (phase rotational sequences in the frequency domain) for the CAZAC sequences. Furthermore, it is possible to apply the code multiplexing transmission method using rotational orthogonal codes or QAM codes of the invention to physical channel (PDCCH) for transmitting the L1/L2 control information in downlink.

In the further, it is conceivable that the feedback information and L1/L2 control information will increase due to the widened band, and it is expected to be effective measures applying the code multiplexing transmission method using rotational orthogonal codes or QAM codes of the invention capable of obtaining the maximum frequency diversity effect and improving transmission characteristics.

The present invention is not limited to the above-mentioned Embodiment, and is capable of being carried into practice with various modifications thereof without departing from the subject matter of the invention.

INDUSTRIAL APPLICABILITY

The present invention is applicable to radio communication systems.

The present application is based on Japanese Patent Application No. 2009-049802 filed on Mar. 3, 2009, entire content of which is expressly incorporated by reference herein.

The invention claimed is:

1. A code multiplexing transmission method in an orthogonal frequency division multiplexing (OFDM)-based radio access scheme, the method comprising:
receiving information symbols of a plurality of sequences input in parallel;
generating different spreading codes based on orthogonal code sequences;
giving different phase rotation to the information symbols or the spreading codes for each symbol sequence and then, spreading the information symbols with the spreading codes for each symbol sequence;
multiplexing spread information symbols corresponding to different symbol sequences; and
placing the multiplexed spread information symbols on a frequency axis and performing Inverse Fast Fourier Transform (IFFT) on the multiplexed spread information symbols to output as an OFDM signal, wherein
the information symbols or the spreading codes are rotated by a phase rotation amount for enabling overlaps in a signal constellation in polar coordinates of the spread information symbols for transmitting different information symbols to be controlled to within a required range,
the multiplexed spread information symbols are assigned to frequencies respectively undergoing independent fading and are transmitted, and
the orthogonal code sequences are generated by:

$$R_L = W_L \mathrm{diag}\{e^{j0\pi/4(L-1)}, \ldots, e^{j1\pi/4(L-1)}, \ldots, e^{j(L-1)\pi/4(L-1)}\}$$

wherein
$R_L$: Rotational Walsh code sequence,
$W_L$: Orthogonal code sequences,
L: Length (spreading factor), L>0, and
e: Euler number, e=2.7182818 . . . .

2. The code multiplexing transmission method according to claim 1, wherein the orthogonal code sequences are any sequences selected from among Walsh code sequences, CAZAC code sequences, phase rotation (DFT) sequences, and orthogonal M sequences.

3. The code multiplexing transmission method according to claim 1, wherein channel coded signals of a physical channel for transmitting ACK/NACK in downlink are the information symbols of the plurality of sequences, and the information symbols are code-multiplexed using Walsh code sequences.

4. The code multiplexing transmission method according to claim 1, wherein channel coded signals of a shared data channel shared by a plurality of users in uplink are the information symbols of the plurality of sequences, and the information symbols are code-multiplexed using phase rotation (DFT) codes.

5. The code multiplexing transmission method according to claim 1, wherein channel coded signals of a physical channel for transmitting control information in uplink are the information symbols of the plurality of sequences, and the information symbols are code-multiplexed using CAZAC code sequences.

6. The code multiplexing transmission method according to claim 1, wherein channel coded signals of a physical channel for transmitting L1/L2 control information in downlink are the information symbols of the plurality of sequences, and the information symbols are code-multiplexed using any of orthogonal code sequences.

7. A code multiplexing transmission method in an orthogonal frequency division multiplexing (OFDM)-based radio access scheme, the method comprising:
    performing Fast Fourier Transform (FFT) on a reception signal from a transmission apparatus and demapping multiplexed spread information symbols that are obtained by multiplexing spread information symbols of different symbol sequences;
    acquiring information of phase rotation given to information symbols or spreading codes in code-multiplexing in the transmission apparatus; and
    detecting the demapped multiplexed spread information symbols based on the information of phase rotation,
    wherein the multiplexed spread information symbols are assigned to frequencies respectively undergoing independent fading and are transmitted, and
    the spreading codes are generated based on orthogonal code sequences which are generated by:

$$R_L = W_L \text{diag}\{e^{j0\pi/4(L-1)}, \ldots, e^{j1\pi/4(L-1)}, \ldots, e^{j(L-1)\pi/4(L-1)}\}$$

wherein
$R_L$: Rotational Walsh code sequence,
$W_L$: Orthogonal code sequences,
L: Length (spreading factor), L>0, and
e: Euler number, e=2.7182818 . . . .

8. The code multiplexing transmission method according to claim 7, wherein detecting the demapped multiplexed spread information symbols is performed using a maximum likelihood detection method.

9. The code multiplexing transmission method according to claim 7, wherein detecting the demapped multiplexed spread information symbols is performed using a minimum means square error equalization method (MMSE).

10. A transmission apparatus using code multiplexing in an orthogonal frequency division multiplexing (OFDM)-based radio access scheme comprising:
    an input section that receives information symbols of a plurality of sequences input in parallel;
    an orthogonal spreading code generating section that generates different spreading codes based on orthogonal code sequences;
    a rotation spreading section that gives different phase rotation to the information symbols or the spreading codes for each symbol sequence and then, spreads the information symbols with the spreading codes for each symbol sequence;
    a multiplexing section that multiplexes spread information symbols corresponding to different symbol sequences; and
    an IFFT section that places the multiplexed spread information symbols on a frequency axis and performs IFFT on the multiplexed spread information symbols to output as an OFDM signal, wherein
    the information symbols or the spreading codes are rotated by a phase rotation amount for enabling overlaps in a signal constellation in polar coordinates of the spread information symbols for transmitting different information symbols to be controlled to within a required range,
    the multiplexed spread information symbols are assigned to frequencies respectively undergoing independent fading and are transmitted, and
    the orthogonal code sequences are generated by:

$$R_L = W_L \text{diag}\{e^{j0\pi/4(L-1)}, \ldots, e^{j1\pi/4(L-1)}, \ldots, e^{j(L-1)\pi/4(L-1)}\}$$

wherein
$R_L$: Rotational Walsh code sequence,
$W_L$: Orthogonal code sequences,
L: Length (spreading factor), L>0, and
e: Euler number, e=2.7182818 . . . .

11. A reception apparatus using code multiplexing in an orthogonal frequency division multiplexing (OFDM)-based radio access scheme comprising:
    a reception section that performs FFT on a reception signal from a transmission apparatus and demaps multiplexed spread information symbols that are obtained by multiplexing spread information symbols of different symbol sequences; and
    a signal detection section that acquires information of phase rotation given to information symbols or spreading codes in code-multiplexing in the transmission apparatus, and detects the demapped multiplexed spread information symbols from the reception signal based on the information of phase rotation,
    wherein the multiplexed spread information symbols are assigned to frequencies respectively undergoing independent fading and are transmitted, and
    the spreading codes are generated based on orthogonal code sequences which are generated by:

$$R_L = W_L \text{diag}\{e^{j0\pi/4(L-1)}, \ldots, e^{j1\pi/4(L-1)}, \ldots, e^{j(L-1)\pi/4(L-1)}\}$$

wherein
$R_L$: Rotational Walsh code sequence,
$W_L$: Orthogonal code sequences,
L: Length (spreading factor), L>0, and
e: Euler number, e=2.7182818 . . . .

\* \* \* \* \*